United States Patent [19]

Dronkers

[11] 4,421,714
[45] Dec. 20, 1983

[54] NOZZLE PENETRATION FOR A NUCLEAR REACTOR PRESSURE VESSEL CLOSURE

[75] Inventor: Peter Dronkers, Mannheim, Fed. Rep. of Germany

[73] Assignee: The Babcock & Wilcox Company, New Orleans, La.

[21] Appl. No.: 211,141

[22] Filed: Nov. 28, 1980

[30] Foreign Application Priority Data

Dec. 22, 1979 [DE] Fed. Rep. of Germany ....... 2952025

[51] Int. Cl.³ ............................................. G21C 13/00
[52] U.S. Cl. .................................... 376/204; 376/285; 376/305; 376/463
[58] Field of Search ................. 376/204, 285, 305, 463

[56] References Cited

U.S. PATENT DOCUMENTS

| | | | |
|---|---|---|---|
| 3,119,746 | 1/1964 | Lemesle et al. | 376/204 X |
| 4,062,726 | 12/1977 | Walling | 376/204 X |
| 4,100,019 | 7/1978 | Groff et al. | 376/204 X |
| 4,298,433 | 11/1981 | Kinnander et al. | 376/204 X |

FOREIGN PATENT DOCUMENTS

| | | | |
|---|---|---|---|
| 1484712 | 4/1966 | France | 376/204 |
| 2133348 | 4/1971 | France | 376/204 |

*Primary Examiner*—Peter A. Nelson
*Attorney, Agent, or Firm*—Robert J. Edwards; Kenneth W. Iles

[57] ABSTRACT

In this type of nozzle penetration, the nozzle (6) consists of a material different than that of the closure (1). In addition, closure (1) is provided with an inside plating. In order to avoid heat stresses on the tension coupling (15) between nozzle (6) and closure (1), a compensating ring (8) is provided between the shoulder (9) of nozzle (6) and contact surface (7) of closure (1). The height "h" of the compensating ring (8) and its material are selected in such a way that the change in elongation resulting from heat expansion of the nozzle and closure materials is compensated in the region of the distance extending from shoulder (9) to tension coupling (15). The material and height "h" can be selected in such a way that a predictable difference in stress is created in the area of the tension coupling upon heating.

2 Claims, 2 Drawing Figures

NOZZLE PENETRATION FOR A NUCLEAR REACTOR PRESSURE VESSEL CLOSURE

BACKGROUND

The present invention relates to nuclear power plant systems and more particularly to a nozzle penetration device for a nuclear reactor pressure vessel closure head.

Such a nozzle penetration is known from Swiss Pat. No. 38 37 06. The penetration, which consists of an austenitic material, is screwed into the ferritic portion of the closure. This tension coupling is subject to great stress during temperature changes due to the different coefficients of expansion. The groove provided in the region of the joint weld provides no compensation for the stresses on the screw coupling, since the differences in stress are present in this region also. There is no possibility of influencing the stresses with this design, nor for constructing e.g., a desired prestressing in the region of the tension coupling.

SUMMARY OF THE INVENTION

The task of influencing the heat stresses on the bearing coupling regions with a nozzle penetration of the type given above is the basis for the present invention. This task is solved according to the invention by providing a compensating ring between the shoulder of the penetration and the contact surface of the closure.

The compensating ring, depending on its composition and height, permits a variation of stresses in the tension coupling area until complete equilization of stress is achieved.

The device according to the invention will now be described on the basis of two examples of embodiment.

DETAILED DESCRIPTION OF THE PREFERRED EMBODIMENTS

Figure 1:
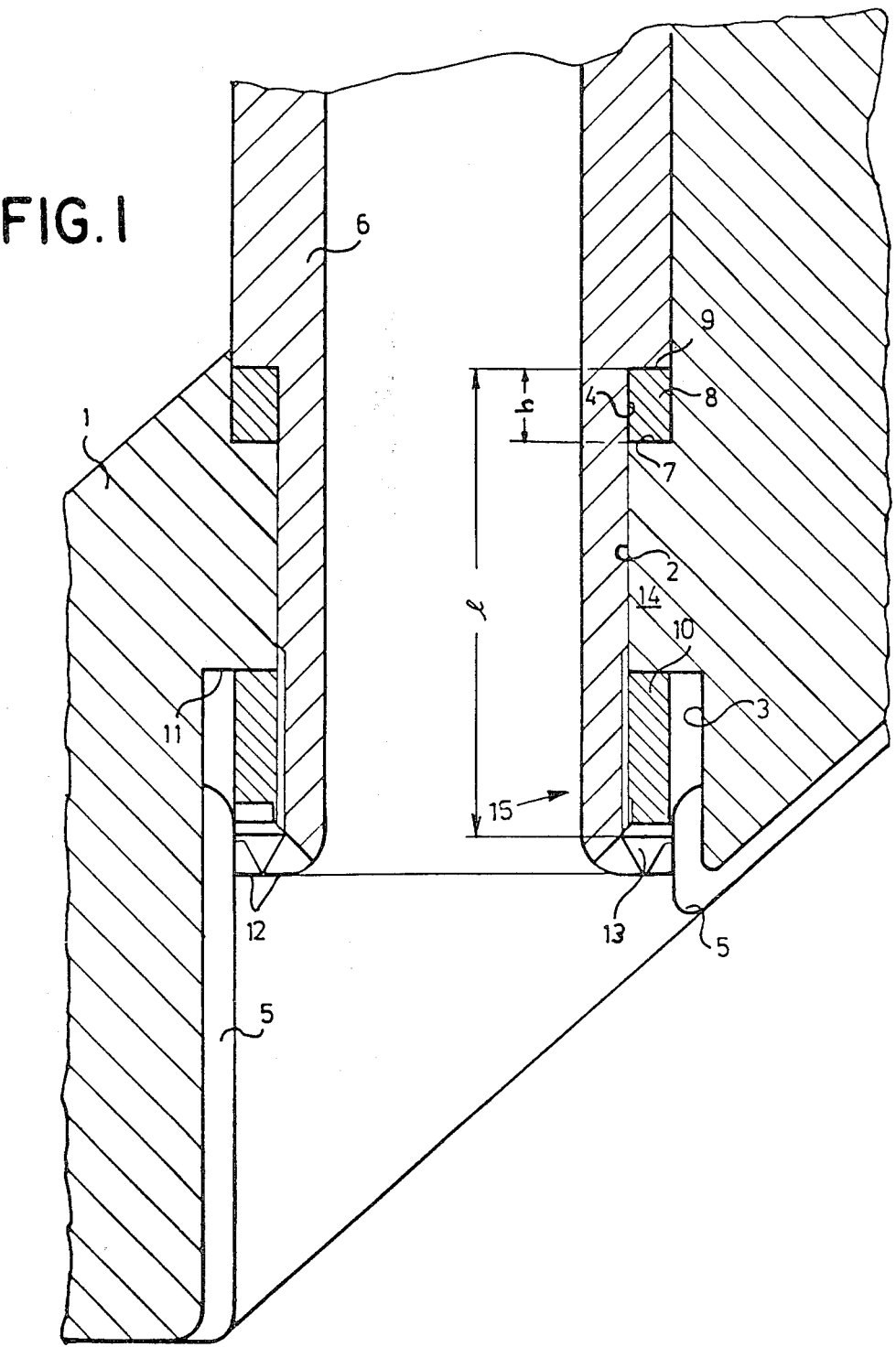
FIG. 1 is a partial sectional view of a nozzle penetration device according to the invention.

FIG. 1 shows a partial section of the closure head 1 of a nuclear reactor pressure vessel (not shown), which is provided with a through-hole 2, shaped as stepped boreholes 3, 4 at its opposite ends. The closure consists of a ferritic material with a heat expansion coefficient of $13 \times 10^{-6}$ and is provided with a plating 5 on its inner side, which extends to stepped borehole 3 of cover 1. A nozzle 6 comprised of a nonferrous base alloy of the DIN designation Ni Cr 15 Fe with a thermal expansion coefficient of $14 \times 10^{-6}$ is inserted into through-hole 2 and projects at its end provided with a thread into the area of stepped borehole 3. A compensating ring 8 made of austenitic material with a thermal expansion coefficient of $17 \times 10^{-6}$ is placed on contact surface 7 formed by stepped borehole 4, and nozzle 6 is braced on this ring by means of its shoulder 9. The nozzle is fastened in the cover by nut 10 engaging in the thread of support 6, which nut comes into contact with surface 11 of stepped borehole 3. With a weld seam 12 serving only for tightness purposes, nozzle 6 is connected to plating 5 with the interposing of a packing ring 13.

Nut 10 consists of a ferritic material, which has the same thermal expansion coefficient as the closure material. If the distance denoted "1" between shoulder 9 and the tension coupling amounts to 80 mm in the above-named materials, then the height "h" of the compensating ring 8 must be 20 mm. An elongation of 0.336 mm is produced for the nozzle in the region of the 80-mm long distance upon heating to approximately 300° C. This value is also obtained together with nut 10, projection 14, and compensating ring 8. In this way it is assured that no heat stresses occur in the region of the tension coupling.

Figure 2:
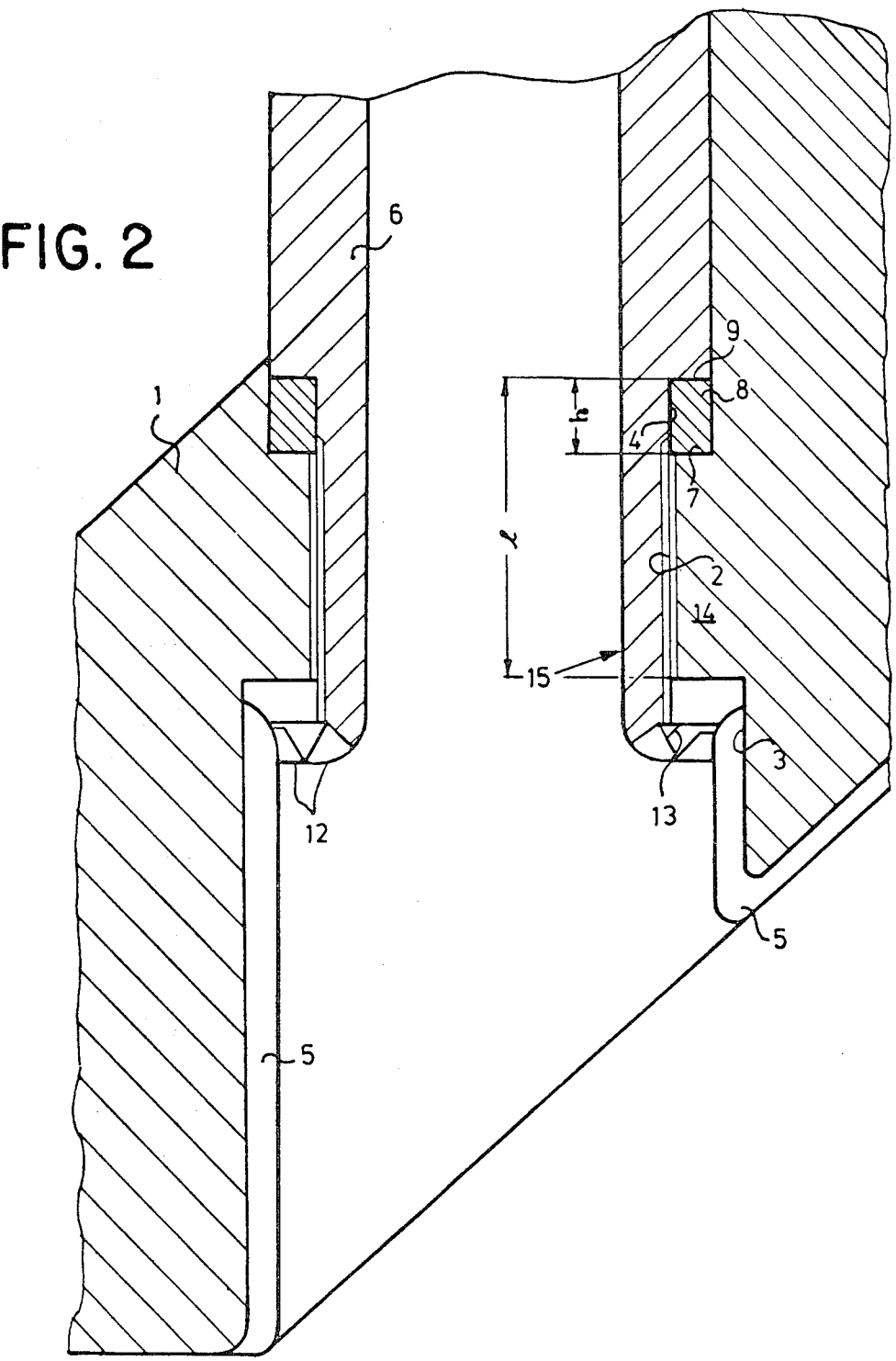
FIG. 2 is a view like FIG. 1 of an alternate embodiment.

In the example of embodiment according to FIG. 2, nozzle 6 is screwed directly into the through-hole 2 provided with an inside threading. A compensating ring 8 is placed on contact surface 7, in the same way as in the embodiment example according to FIG. 1, and nozzle 6 is braced by its shoulder 9 on this ring. In this case also, the height "h" and the material of compensating ring 8 are selected in such a way that the elongation of the nozzle in the region of length "l" is equal to the elongation of projection 14 plus the height of compensating ring 8 upon a change in temperature.

If a specific difference in stress is desired, then this can be accomplished by changing height "h" or the material composition of compensating ring 8.

The heat stresses in the region of the tension coupling can be successfully controlled with the nozzle penetration according to the invention.

The above description and drawings are illustrative of two embodiments which achieve the objects, features and advantages of the present invention, and is not intended that the present invention be limited thereto. Any modification of the present invention which comes within the spirit and scope of the following claims is considered part of the present invention.

What is claimed as new and desired to be secured by Letters Patent of the United States is:

1. A nozzle penetration for a nuclear pressure vessel closure head comprising:
   a closure head made of ferritic material having an inside cladding of austenitic material;
   a nozzle composed of an alloy of the Ni Cr 15 Fe type having a shoulder portion intermediate its two ends penetrating said closure head and connected thereto by frictional engagement;
   a compensating ring of austenitic material seated between said shoulder and a support surface of said closure head.

2. An apparatus according to claim 1 wherein the height and said different material of said compensating ring are selected such that the elongation of said nozzle and closure head materials in the area extending from said shoulder up to said friction connection as a result of thermal expansion is equalized.

* * * * *

UNITED STATES PATENT AND TRADEMARK OFFICE
CERTIFICATE OF CORRECTION

PATENT NO. : 4,421,714
DATED : February 28, 1980
INVENTOR(S) : PETER DRONKERS

It is certified that error appears in the above-identified patent and that said Letters Patent is hereby corrected as shown below:

Assignee: delete "The Babcock & Wilcox Company, New Orleans, La." and insert "Brown Boveri Reaktor BmbH, Mannheim, West Germany".

In the Claims, insert claim 3, which reads as follows:

"An apparatus according to claim 2 wherein said height of said compensating ring is approximately 20 mm and the distance from said shoulder up to said friction connection is approximately 80 mm."

On the title page, "2 Claims, 2 Drawing Figures" should read -- 3 Claims, 2 Drawing Figures --.

Signed and Sealed this

Eighth Day of May 1984

[SEAL]

Attest:

Attesting Officer

GERALD J. MOSSINGHOFF

Commissioner of Patents and Trademarks